United States Patent
Choi et al.

(10) Patent No.: US 9,499,031 B2
(45) Date of Patent: *Nov. 22, 2016

(54) REAR DOOR DEVICE IN VEHICLE

(71) Applicants: Hyundai Motor Company, Seoul (KR); Kwangjin Co., Ltd., Ansan-si (KR)

(72) Inventors: Jae Hong Choi, Gwangmyeong-si (KR); YoungBae Gong, Asan-si (KR)

(73) Assignees: Hyundai Motor Company, Seoul (KR); Kwangjin Co., Ltd., Ansan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/495,461

(22) Filed: Sep. 24, 2014

(65) Prior Publication Data

US 2015/0183303 A1 Jul. 2, 2015

(30) Foreign Application Priority Data

Dec. 27, 2013 (KR) ........................ 10-2013-0165790

(51) Int. Cl.
*B60J 5/04* (2006.01)
*B60J 5/06* (2006.01)
*B60J 5/12* (2006.01)
*E05D 15/06* (2006.01)
*E05D 15/10* (2006.01)

(52) U.S. Cl.
CPC ........ *B60J 5/047* (2013.01); *B60J 5/06* (2013.01); *B60J 5/12* (2013.01); *E05D 15/0621* (2013.01); *E05D 15/101* (2013.01)

(58) Field of Classification Search
CPC .............. B60J 5/047; B60J 5/12; B60J 5/06; B60J 5/0479; E05Y 2900/531; E05D 15/1047; E05D 15/101; E05D 15/1081

USPC ........ 49/208, 209, 210, 216, 221, 352, 360; 296/155

See application file for complete search history.

(56) References Cited

U.S. PATENT DOCUMENTS

| | | | |
|---|---|---|---|
| 4,945,677 A * | 8/1990 | Kramer ........................... 49/210 |
| 5,168,666 A * | 12/1992 | Koura et al. .................... 49/360 |
| 5,967,595 A * | 10/1999 | Heya et al. .................... 296/155 |
| 5,992,097 A * | 11/1999 | Makiuchi et al. ............... 49/216 |
| 6,036,257 A * | 3/2000 | Manuel ......................... 296/155 |
| 6,183,039 B1 * | 2/2001 | Kohut et al. .................. 296/155 |
| 6,530,619 B2 * | 3/2003 | Fukumoto et al. ........... 296/155 |
| 6,793,268 B1 * | 9/2004 | Faubert et al. .......... 296/146.12 |
| 2006/0181109 A1 * | 8/2006 | Mitsui et al. ................. 296/155 |
| 2006/0249983 A1 * | 11/2006 | Heuel et al. .................. 296/155 |
| 2007/0096504 A1 * | 5/2007 | Kothe et al. .................. 296/155 |
| 2008/0100091 A1 * | 5/2008 | Kunishima et al. ........ 296/146.1 |
| 2008/0106120 A1 * | 5/2008 | Kim et al. ............... 296/190.01 |

FOREIGN PATENT DOCUMENTS

KR 1998-069736 A 10/1998

* cited by examiner

*Primary Examiner* — Justin Rephann
(74) *Attorney, Agent, or Firm* — Morgan, Lewis & Bockius LLP

(57) ABSTRACT

A rear door device for a vehicle may include a rear door, an upper rail mounted to the rear door in a width direction, an upper slider inserted in the upper rail to support the upper rail, a lower rail mounted to a vehicle body and formed with a curved portion, a lower slider inserted in the lower rail and movable along the lower rail, an upper support structure having one end connected to the upper slider and the other end mounted to the vehicle body for supporting the upper slider, and a connection structure for connecting the lower slider to the upper rail. The rear door device permits the rear door to be opened or closed by sliding it forward or backward in the length direction of the vehicle.

18 Claims, 16 Drawing Sheets

REAR DOOR DEVICE IN VEHICLE

CROSS-REFERENCE TO RELATED APPLICATION

The present application claims priority of Korean Patent Application Number 10-2013-0165790 filed on Dec. 27, 2013, the entire contents of which application are incorporated herein for all purposes by this reference.

NAMES OF THE PARTIES TO A JOINT RESEARCH AGREEMENT

Hyundai Motor Company and Kwangjin Co., Ltd were parties to a joint research agreement prior to the effective filing date of the instant application.

BACKGROUND OF INVENTION

Field of Invention

The present invention relates a rear door device in a vehicle. More particularly, the present invention relates to a rear door device in a vehicle which moves backward in a length direction of the vehicle to open a door opening in the vehicle body and moves forward in the length direction of the vehicle to close the door opening.

Description of Related Art

In general, the vehicle has a predetermined sized cabin formed therein for boarding of a driver and accompanying occupants therein, and cabin opening/closing doors mounted to the vehicle body for opening/closing the cabin.

In a case of a passenger vehicle, the cabin opening/closing doors are front doors mounted to a front side of the vehicle in the length direction of the vehicle, and rear doors mounted to a rear side of the vehicle in the length direction of the vehicle, wherein, in general, the front doors and the rear doors are rotatably mounted to the vehicle body with hinges.

In a case of a van on which many people may board, the cabin opening/closing door opens/closes the cabin as the cabin opening/closing door slides forward/backward in the length direction of the vehicle.

Since the sliding type cabin opening/closing door in the van opens the cabin as the opening/closing door moves backward in the length direction of the vehicle, and closes the cabin as the opening/closing door moves forward in the length direction of the vehicle, the sliding type cabin opening/closing door in the van has a space required for opening/closing the door smaller than the hinge type cabin opening/closing door in the passenger vehicle, to have an advantage of opening the door opening formed in the vehicle body completely even in an opening/closing space with a small width.

However, a related art sliding type cabin opening/closing door has a drawback in that the related art sliding type cabin opening/closing door in the van requires three support and guide rails and components related thereto for respectively supporting an upper side, a middle side and a lower side of the door, resulting in the increase of a weight of the vehicle and a number of components, and the decrease of design freedoms of the vehicle.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a rear door device in a vehicle having advantages of enabling easy opening/closing of the rear door even if a door opening/closing space is small, reducing a number of components, weight, and cost of the vehicle, and improving vehicle exterior design freedoms.

Devised taking above problems and/or other problems into account, the present invention is to provide a rear door device in a vehicle which can be slidably opened/closed in backward/forward in a length direction of the vehicle for easy opening/closing of the rear door even if a door opening/closing space is small, in which the rear door is supported only with two rails for reducing a number of components, weight, and cost of the vehicle, and which permits to improve vehicle exterior design freedoms.

In various aspects of the present invention, a rear door device in a vehicle may include: a rear door; an upper rail mounted to the rear door in a width direction thereof; an upper slider inserted in the upper rail to support the upper rail; a lower rail mounted to a vehicle body and having a curved portion formed thereon; a lower slider inserted in the lower rail and movable along the lower rail; an upper support structure having one end connected to the upper slider and the other end mounted to the vehicle body for supporting the upper slider; and a connection structure for connecting the lower slider to the upper rail.

The upper rail may include a center rail positioned at a middle portion of the upper rail in a height direction, an upper side rail positioned over the center rail, and a lower side rail positioned under the center rail.

The center rail, the upper side rail and the lower side rail each may have a "⊏" shaped cross section continuous in a length direction thereof, openings of the upper side rail and the lower side rail may be arranged substantially perpendicular to an opening of the center rail, and the openings of the upper side rail and the lower side rail may be formed to face each other.

The rear door device may further include a striker mounted to a lower side of a predetermined portion of the center rail in the length direction and projected upward in the height direction.

The upper slider may include: an upper slider body of a substantially rectangular plate shape; two center rail rollers rotatably mounted to a front side of the upper slider body, arranged at a predetermined distance from each other in the width direction, to be inserted in the center rail for rolling as the upper rail moves; two upper side rail rollers rotatably mounted to the front side of the upper slider body, facing upward, arranged at a predetermined distance in the width direction for rolling according to movement of the upper rail; two lower side rail rollers rotatably mounted to the front side of the upper slider body, facing downward, arranged at a predetermined distance from each other in the width direction for rolling according to movement of the upper rail; and an upper flange and a lower flange projected from opposite edges of the upper slider body, each extended in a length direction substantially perpendicular to the respective edge, wherein the upper flange may have a first assembly through-hole formed therein, and the lower flange may have another first assembly through-hole, a second assembly through-hole, and a third assembly through-hole formed side by side.

The upper support structure may include a swing arm having one end rotatably and securely inserted between the upper flange and the lower flange of the upper slider body, and a mounting bracket having one end fastened to the other end of the swing arm, and the other end fixedly mounted to the vehicle body.

The swing arm may include: a swing arm body; a cylindrical first flange projected as one unit therewith from one side fore end of the swing arm body; and two second flanges projected as one unit therewith from the other side fore end of the swing arm body in the width direction and arranged at a left side and a right side of the swing arm body, wherein the first flange may have a cut-out portion such that one side edge of the cut-out portion forms a pressing edge, and a return spring may be built-in or coupled with the cylindrical first flange.

The lower flange of the upper slider body may have a rail locking device mounted thereto for selectively securing the upper rail to the upper slider.

The rail locking device may include: a first latch and a second latch rotatably mounted in a second assembly through-hole and a third assembly through-hole in the lower flange of the upper slider body, respectively; and a pressing spring for applying a pressure to the first latch and the second latch in a clockwise direction, wherein the first latch may include a first hook at one end thereof, and a pressing projection projected from an opposite side of the first hook so as to be pressed by the pressing edge, and the second latch may include a second hook for detachably hooking the striker, the second hook having an opened type hooking recess constructed of a first side and a second side which is substantially parallel to the first side and longer than the first side, and a latch projection for being detachably caught at the first hook of the first latch.

The lower rail may include a center rail positioned at a middle portion in a height direction of the lower rail, an upper side rail positioned over the center rail, and a lower side rail positioned under the center rail.

The center rail, the upper side rail, and the lower side rail each may have a " ⊏ " shaped cross section continuous in a length direction thereof, wherein the upper side rail, and the lower side rail may have openings facing to each other and arranged substantially perpendicular to an opening of the center rail.

The center rail may have a rear side fore end which faces a rear side of the vehicle when the center rail is mounted to the vehicle body, with a mounting hole formed therein, wherein a hold open latch may be mounted to the mounting hole for coupling to the lower slider when the rear door is opened or fully opened.

The lower slider may include: a lower slider body having a substantially rectangular plate shape; two center rail rollers arranged at a predetermined distance from each other in a length direction thereof, rotatably mounted on a front side of the lower slider body, and inserted in the center rail of the lower rail for rolling; two upper side rail rollers arranged at a predetermined distance from each other in the length direction rotatably mounted on the front side of the lower slider body adjacent to the two center rail rollers and inserted in the upper side rail of the lower rail for rolling; and two lower side rail rollers arranged at a predetermined distance from each other in the length direction adjacent to the two center rail rollers rotatably mounted on the front side of the lower slider body in a direction opposite to the two upper side rail rollers and inserted in the lower side rail of the lower rail for rolling, wherein the lower slider body may have a striker mounted to one side fore end of the front side of the lower slider body in the length direction thereof for detachably coupling to the hold open latch to hold an opened state of the rear door.

The lower slider body may have an adjuster hole formed in the other side fore end in the length direction thereof, with an adjuster block mounted thereto and adjustable in a vertical direction in a width direction of the lower slider body, and an adjuster roller rotatably mounted to the adjuster block.

The lower slider body may have an upper flange and a lower flange formed as one unit therewith, the upper flange and the lower flange projected respectively from an upper edge and a lower edge extended in the length direction of the lower slider body and substantially perpendicular thereto, and one end of the connection structure may be rotatably and securely inserted between the upper flange and the lower flange.

The connection structure may include a swing arm having one end secured to the lower slider body, and a substantially square support bar mounted to the other end of the swing arm and fixedly connected to the upper rail as one unit therewith.

The swing arm may have one side fore end with a substantially square box shaped housing formed as one unit therewith, and the housing may have one end of the support bar inserted therein and fixedly mounted thereto, the swing arm may have one side at the other side fore end with two pairs of first and second upper and lower wire guide flanges fixedly secured thereto, and a roller may be mounted to a gap between each of the first and second upper and lower wire guide flanges.

The swing arm may have a guide hole formed in a side and extended along the side, the first wire fixture may be movably inserted in the guide hole and able to adjust a position thereof along the guide hole, and the first wire fixture may have a fastening bolt provided thereto.

Two guide rollers may be rotatably inserted between the upper flange and the lower flange of the lower slider, each of the two guide rollers may have a guide groove formed in a predetermined portion in a length direction thereof and recessed in the respective guide roller continuously in a circumferential direction thereof, a second wire fixture may be fixedly secured to a lower side of a right side of the rear door panel, and a wire may be wound or partially wound on the guide grooves of the two guide rollers in a tightened state, and may have one end fixedly connected to the second wire fixture and the other end secured to the first wire fixture of the swing arm.

The wire may be selectively inserted between the second upper and lower wire guide flanges according to swing of the swing arm.

The rear door device in accordance with various aspects of the present invention can open/close the rear door even in a case a rear door opening/closing space is small as the rear door is opened/closed while sliding forward/backward in the length direction of the vehicle along the center rail mounted to the rear door and the lower rail mounted to the vehicle body.

And, since the rear door device in accordance with various aspects of the present invention does not require the upper rail and devices related thereto compared to the related art sliding door, not only reduction of a number of components, weight and a cost of the vehicle can be devised, design freedom of the vehicle can be improved, but also deterioration of exterior beauty of the vehicle can be prevented.

Moreover, since the rear door can slide smoothly along the center rail and the lower rail after the rear door swings to a predetermined angle securely, the opening/closing of the rear door is soft, smooth and secure.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, a rear door device in a vehicle in accordance with an exemplary embodiment of the present invention will be described with reference to the attached illustrative drawings.

Figure 1:
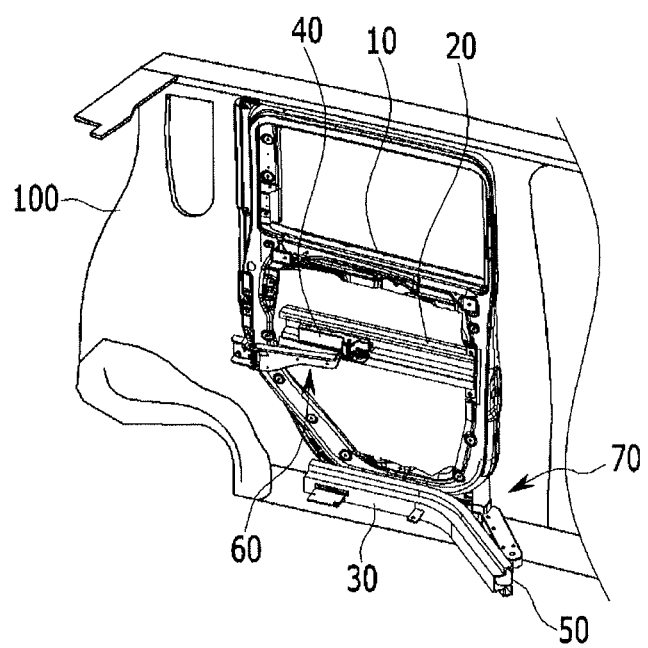
FIG. 1 illustrates a perspective view of an exemplary rear door device in accordance with the present invention.

Referring to FIG. 1, the rear door device in accordance with an exemplary embodiment of the present invention may include an upper rail 20 mounted to an upper side of a rear door panel 10 extended in a width direction of the rear door or the rear door panel 10, a lower rail 30 mounted to a vehicle body 100 extended in a length direction of the vehicle body 100, an upper slider 40 inserted in the upper rail 20 for supporting the upper rail 20, a lower slider 50 mounted inserted in the lower rail 30 to be movable along the lower rail 30, an upper support structure 60 having one end connected to the upper slider 40 and the other end mounted to the vehicle body 100 for supporting the upper slider 40 on the vehicle body, and a connection structure 70 connected between the lower slider 50 and the upper rail 20.

Figure 2:
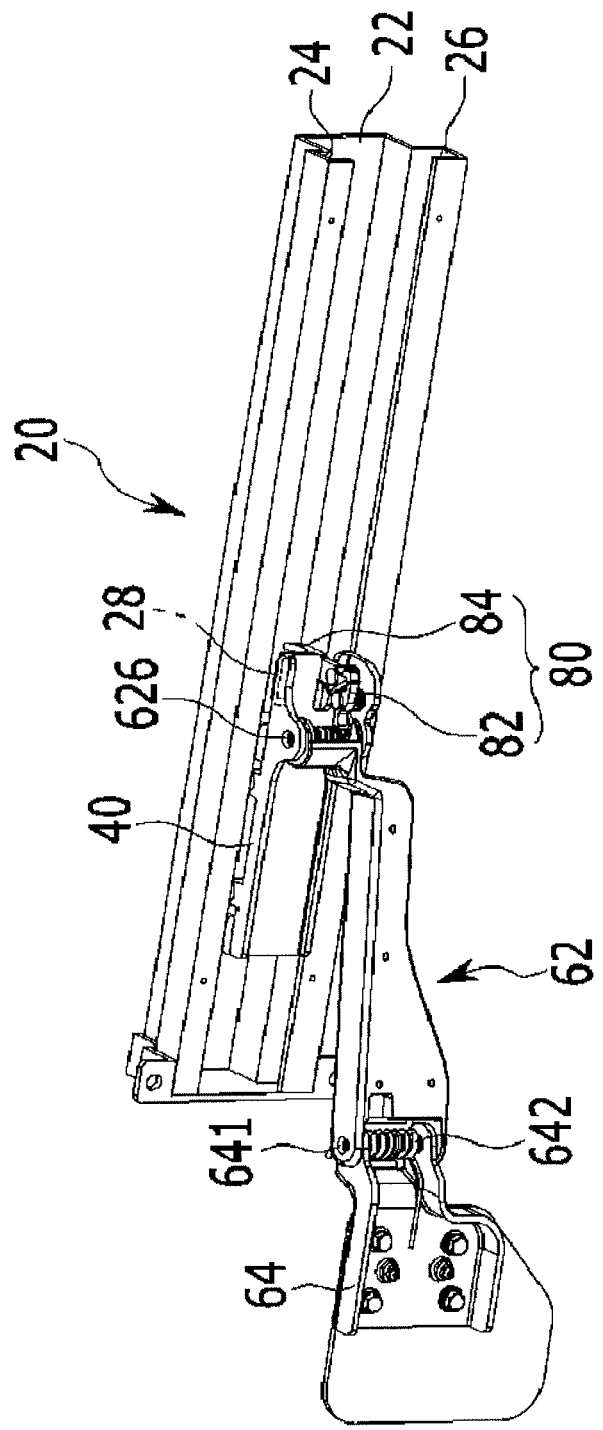
FIG. 2 illustrates a perspective view of an upper rail and an upper support structure coupled together in an exemplary rear door device in accordance with the present invention.

Referring to FIG. 2, the upper rail 20 may include a center rail 22 positioned at middle or middle portion in a height direction, an upper side rail 24 positioned over the center rail 22, and a lower side rail 26 positioned under the center rail 22. The upper rail 20 may have a structure in which the center rail 22, the upper side rail 24, and the lower side rail 26 are formed as one unit.

Each of the center rail 22, the upper side rail 24, and the lower side rail 26 may have a structure in which a "⊏" character shaped cross section is continuous in the length direction. The center rail 22 has an opening to which openings of the upper side rail 24 and the lower side rail 26 may be arranged perpendicular or substantially perpendicular respectively to face each other.

There may be a striker 28 mounted to a lower side of a predetermined portion of the center rail 22 in the length direction projected upward in a height direction. The striker 28 may be formed in a substantially "U" shape.

Figure 3:
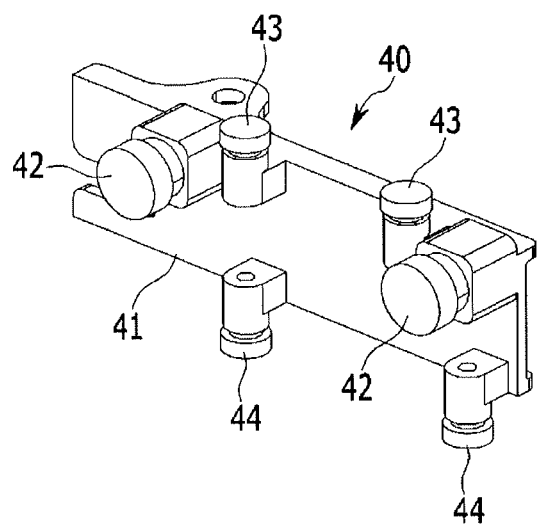
FIG. 3 illustrates a perspective view of an upper slider in an exemplary rear door device in accordance with the present invention.
Figure 4:
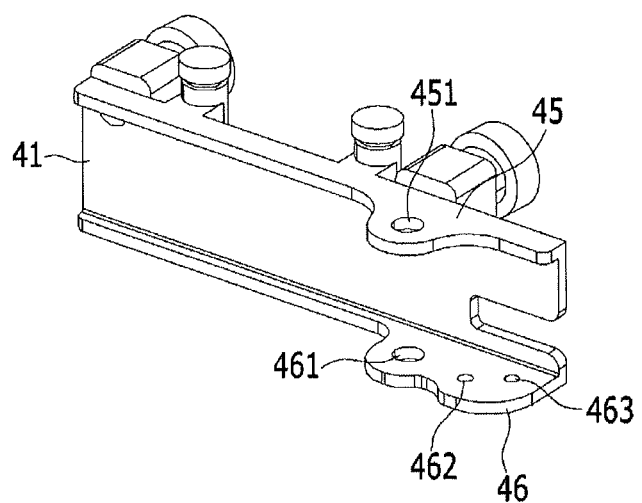
FIG. 4 illustrates another perspective view of an upper slider in an exemplary rear door device in accordance with the present invention.

The upper rail 20 may have the upper slider 40 mounted thereto slidably inserted therein. Referring to FIGS. 3 and 4, the upper slider 40 may include an upper slider body 41 of a substantially rectangular plate shape.

Rotatably mounted to a front side of the upper slider body 41, there may be center rail rollers such as two center rail rollers 42 arranged at a predetermined distance from each other in a width direction so to be inserted in the center rail 22 for rolling according to movement of the upper rail 20.

Rotatably mounted to the front side of the upper slider body 41 to face upward, there may be upper side rail rollers such as two upper side rail rollers 43 arranged at a predetermined distance from each other in the width direction for rolling according to movement of the upper rail 20.

Rotatably mounted to the front side of the upper slider body 41 to face downward, there may be lower side rail rollers such as two lower side rail rollers 44 arranged at a predetermined distance from each other in the width direction for rolling according to movement of the upper rail 20.

There may be an upper flange 45 and a lower flange 46 formed projected from opposite edges extended in a width direction perpendicular or substantially perpendicular to the edges respectively, wherein the upper flange 45 may have a first assembly hole 451 formed therein to pass therethrough, and the lower flange 46 may have a first assembly hole 461, a second assembly hole 462, and a third assembly hole 463 formed side by side to pass through the lower flange 46.

Figure 5:
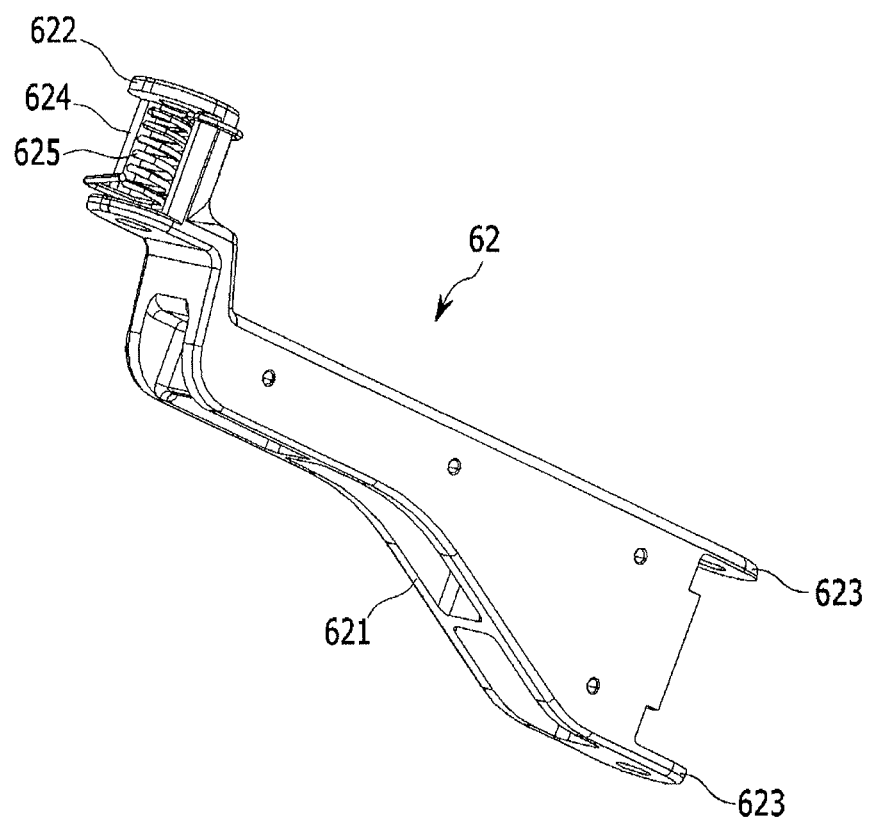
FIG. 5 illustrates a perspective view of a swing arm of an upper support structure in an exemplary rear door device in accordance with the present invention.

Referring to FIG. 5, the upper support structure 60 may include a swing arm 62 having one end rotatably and securely inserted between the upper flange 45 and the lower flange 46 of the upper slider body 41.

The swing arm 62 may include a swing arm body 621, a cylindrical first flange 622 projected, and extended, from one side fore end of the swing arm body 621 as one unit therewith, and two second flanges 623 projected, and extended, from the other side fore ends of the swing arm body 622 as one unit therewith arranged on a left side and a right side of the swing arm body 62 in a width direction.

The first flange 622 has a cut-out portion such that one side edge of the cut-out portion forms a pressing edge 624 for pressing a latch to be described later to rotate the latch. Built in the cylinder of the first flange 622, there is a return spring 625 for returning the swing arm 62 to an original position after a swing motion.

Referring to FIG. 2, the first flange 622 of the swing arm 62 is inserted and rotatably secured between the upper flange 45 and the lower flange 46 of the upper slider body 41 with an assembly pin 626 which passes through the upper flange 45 and the lower flange 46.

The second flange 623 of the swing arm body 621 may be secured to, and supported by, a mounting bracket 64, and the mounting bracket 64 may be mounted to a vehicle body, such as the vehicle body 100 illustrated in FIGS. 1 and 16(A)-16(D). Between the two second flanges 623 of the swing arm body 621, one end of the mounting bracket 64 may be inserted and secured with a pass through assembly pin 641. Therefore, the swing arm 62 can swing around the mounting bracket 64.

In order to make the swing arm 62 to return to an original position after the swing arm 62 swings round the mounting bracket 64, a return spring 642 may be mounted and wound on an outside circumference of the assembly pin 641.

Figure 6:
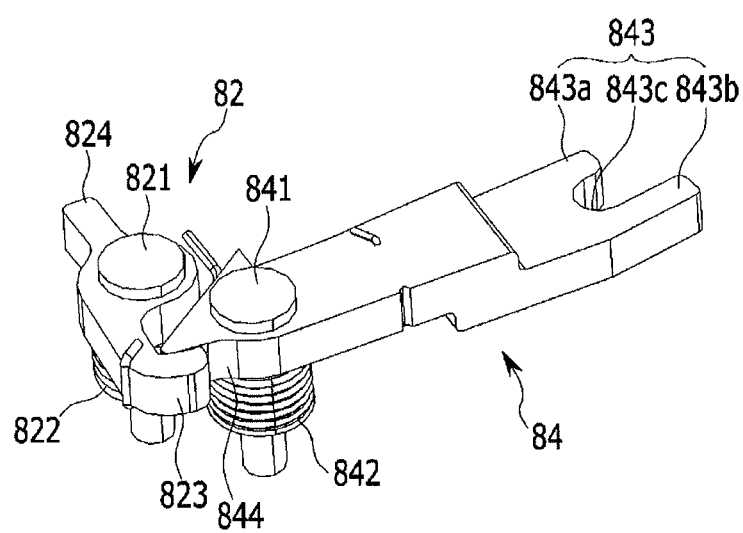
FIG. 6 illustrates a perspective view of a locking device in an exemplary rear door device in accordance with the present invention.

Referring to FIGS. 2 and 6, the lower flange 46 of the upper slider body 41 may have a rail locking device 80 mounted thereto. The rail locking device 80 may include latches such as a first latch 82 and a second latch 84 rotatably mounted to the lower flange 46 of the upper slider body 41.

The first latch 82 may be assembled to the second assembly hole 462 with an assembly pin 821. The assembly pin 821 may have a pressing spring 822 mounted and wound around an outside circumference thereof for applying a pressure to the first latch 82 in a clockwise direction.

The first latch 82 may include a hook 823 at one end thereof. The first latch 82 may include a pressing projection 824 formed projected from an opposite side of the hook 823 with reference to the assembly pin 821 so as to be pressed by the pressing edge 624.

The second latch 84 may be assembled to the third assembly hole 463 with an assembly pin 841. The assembly pin 841 may have a pressing spring 842 mounted wound on an outside circumference thereof for applying a pressure to the second latch 84 in a clockwise direction.

The second latch 84 may include a hook 843 having an opened type hooking recess 843c constructed of a first side 843a having a short length, and a second side 843b substantially parallel to the first side 843a and having a length relatively longer than the first side, and the hook 843 may be detachably caught by the striker 28 at the open type hooking recess 843c. The second latch 84 may include a latch projection 844 for being detachably caught at the hook 823 of the first latch 82.

The first latch 82 and the second latch 84 construe a locking member for locking or unlocking the rail 20 to/from the upper slider 40. FIG. 2 illustrates the upper rail 20 and the upper slider 40 locked as one unit with the two first latch 82 and the second latch 84. Consequently, the upper rail 20 and the upper slider 40 are unable to make relative movement with respect to the other.

Figure 7:
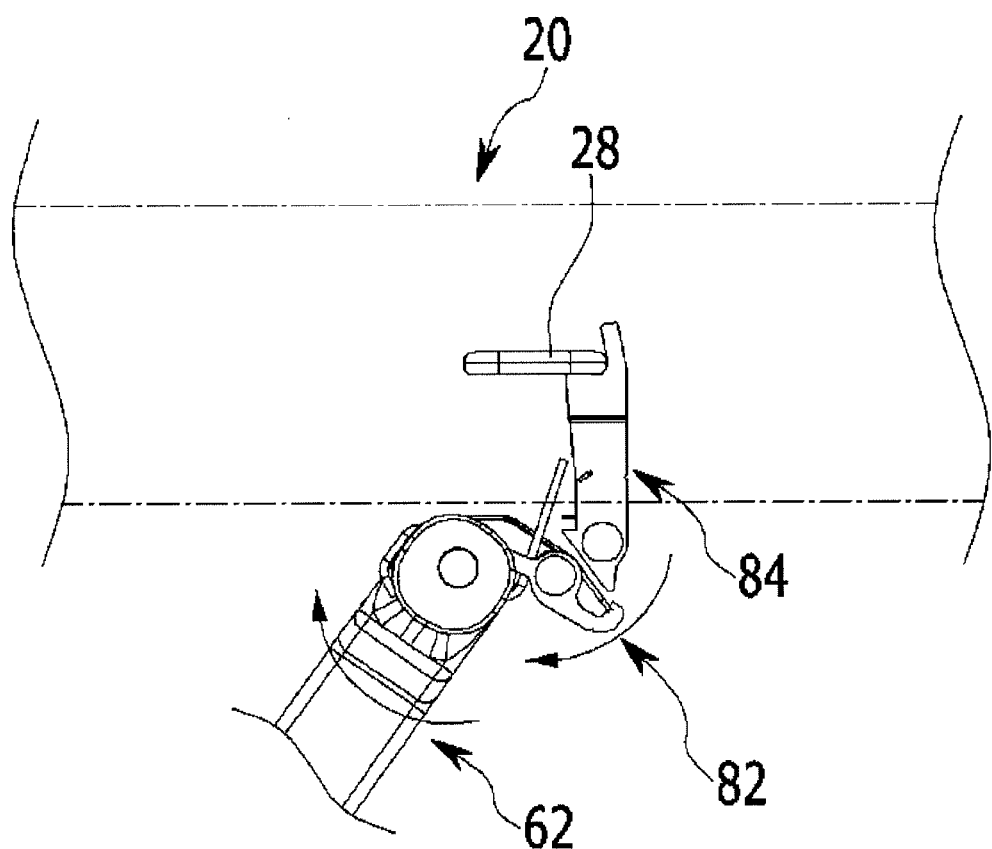
FIG. 7 illustrates a schematic view showing a state in which an upper rail is locked by a locking device in an exemplary rear door device in accordance with the present invention, for describing operation thereof.

Referring to FIG. 7, if the swing arm 62 swings by, for example, about 80° owing to swing caused by opening of the rear door, the pressing edge 624 of the swing arm 62 presses the pressing projection 824 of the first latch 82, to rotate the first latch 82 in an anti-clockwise direction centered on the assembly pin 821 accordingly, making the latch projection 844 of the second latch 84 freed from the hook 823 of the first latch 82, thereby making the second latch 84 free from the first latch 82.

Therefore, the upper rail 20 is in a state locked at the slider 40 only with the second latch 84 caught at the striker 28, i.e., in a state the striker 28 is inserted in, and latched on, the open type latch recess 843b of the hook 843 of the second latch 84.

Figure 8:
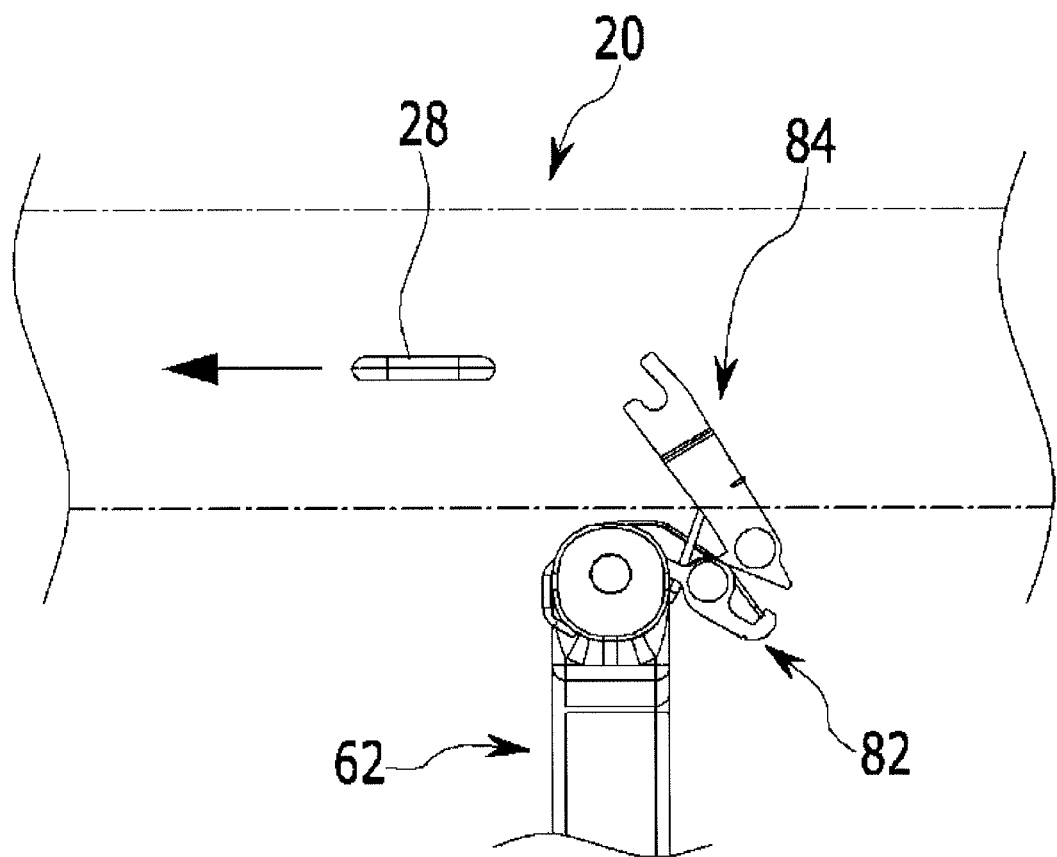
FIG. 8 illustrates a schematic view showing a state in which an upper rail is unlocked from a locking device in an exemplary rear door device in accordance with the present invention, for describing operation thereof.

Referring to FIG. 8, in a state described above, if the upper rail 20 moves in a direction away from the second latch 84, i.e., the rear door moves backward in the length direction of the vehicle, since the striker 28 at the upper rail 20 moves away from the latch recess 843 in the hook 843 along the opening smoothly, the upper rail 20 is unlocked from the upper slider 40.

Accordingly, the upper rail 20 can move backward in the length direction of the vehicle in a state the upper rail 20 is supported on the upper slider 40, and, as the rollers of the upper slider 40 built in the upper rail 20 roll in a state the rollers are in contact with the upper rail 20 according to movement of the upper rail 20, the movement of the upper rail 20 becomes smooth.

Particularly, since the upper side rail rollers 43 and the lower side rail rollers 44 support load of the rear door, to prevent the rear door from twisting or rolling in an opening/closing process of the rear door.

In the meantime, if the upper rail 20 moves forward, making the second latch 84 to be latched at the striker 28, the upper rail 20 is coupled to, and locked at the upper slider 40, and the second latch 84 is, in turn, caught and locked at the first latch 82, making the upper rail 20 caught at a fixed body, such as the vehicle body 100, through the swing arm 62 and the mounting bracket 64.

Figure 9:
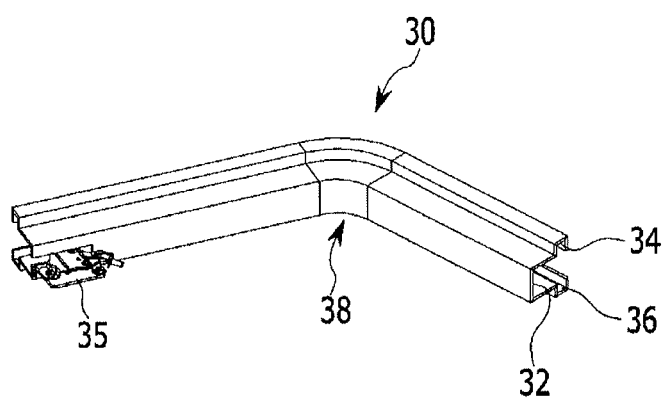
FIG. 9 illustrates a perspective view of a lower rail in an exemplary rear door device in accordance with the present invention.

Referring to FIG. 9, the lower rail 30 may include a center rail 32 positioned at middle or middle portion in a height direction of the lower rail 30, an upper side rail 34 positioned over the center rail 32, and a lower side rail 36 positioned under the center rail 32.

The center rail 32, the upper side rail 34, and the lower side rail 36 may have curved portions 38 at predetermined portions in a length direction thereof, respectively. The lower rail 30 may have a structure in which the center rail 32, the upper side rail 34, and the lower side rail 36 are formed as one unit. The center rail 32, the upper side rail 34, and the lower side rail 36 may have "⊏" shaped cross sections continuous in the length direction, respectively. The upper side rail 34, and the lower side rail 36 may have openings arranged perpendicular or substantially perpendicular to an opening of the center rail 32 to face each other.

The center rail 32 may have one side fore end in a length direction thereof, e.g., a rear side fore end which faces a rear side of the vehicle when the center rail 32 is mounted to the vehicle body, with a mounting hole formed therein, to which a hold open latch 35 may be mounted. The hold open latch 35 serves to couple to the striker 55 of the lower slider 50 to hold an opened state of the rear door when the rear door is opened, or fully opened.

Figure 10:
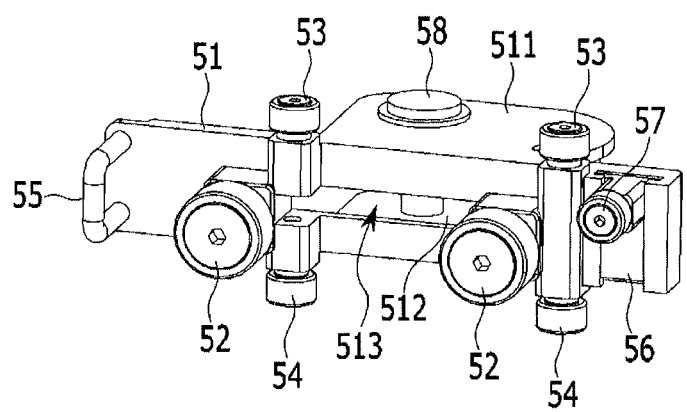
FIGS. 10 and 11 illustrate perspective views of a lower slider in an exemplary rear door device in accordance with the present invention, respectively.
Figure 11:
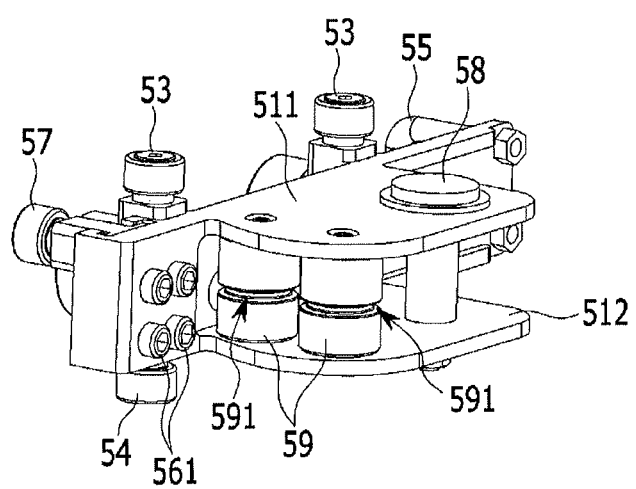

Referring to FIGS. 10 and 11, the lower slider 50 may include a lower slider body 51 having a substantially rectangular plate shape, a plurality of rollers such as two center rail rollers 52 arranged at a predetermined distance from each other in a length direction thereof rotatably mounted on a front side of the lower slider body 51 inserted in the center rail 32 of the lower rail 30 for rolling, two upper side rail rollers 53 arranged at a predetermined distance from each other in the length direction rotatably mounted on the front side of the lower slider body 51 adjacent to the two center rail rollers 52 inserted in the upper side rail 34 of the lower rail 30 for rolling, and two lower side rail rollers 54 arranged at a predetermined distance from each other in the length direction adjacent to the two center rail rollers 52 rotatably mounted on the front side of the lower slider body 51 to in a direction opposite to the two upper side rail rollers 53 inserted in the lower side rail 36 of the lower rail 30 for rolling.

And, the lower slider body 51 may have a striker 55 mounted to one side fore end of the front side of the slower slider body 51 in the length direction thereof for detachably coupling to the hold open latch 35 to hold an opened state of the rear door.

And, the lower slider body 51 has an adjuster hole formed in the other side fore end in the length direction thereof, with an adjuster block 56 mounted thereto adjustable in a vertical direction along a width direction of the lower slider body 51, to which an adjuster roller 57 is rotatably mounted. That is, depending on a position of the adjuster block 56 fastened to the adjuster hole with an adjuster bolt 561, a position of the adjuster roller 57 can be adjusted.

The adjuster roller 57 serves to abut to an upper side of the center rail 32 of the lower rail 30 to support a load of the rear door applied thereto through the connection structure, and may have a function of absorbing tolerances of the lower rail 30 and the rollers.

The lower slider body 51 may have an upper flange 511 and a lower flange 512 formed as one unit therewith projected from an upper edge and a lower edge extended in the length direction of the lower slider body 51 perpendicular or substantially perpendicular thereto, respectively. Between the upper flange 511 and the lower flange 512, one end of the connection structure 70 is inserted and rotatably secured with a pass through assembly pin 58.

The lower slider body 51 may have a guide hole 513 formed in the front side in the length direction Between the upper flange 511 and the lower flange 512, there may be rollers such as two guide rollers 59 rotatably mounted thereto inserted therein. Each of the two guide rollers 59 may have a guide groove 591 formed in a predetermined portion in a length direction thereof recessed in the guide rollers 59 in a circumferential direction thereof, continuously.

Figure 12:
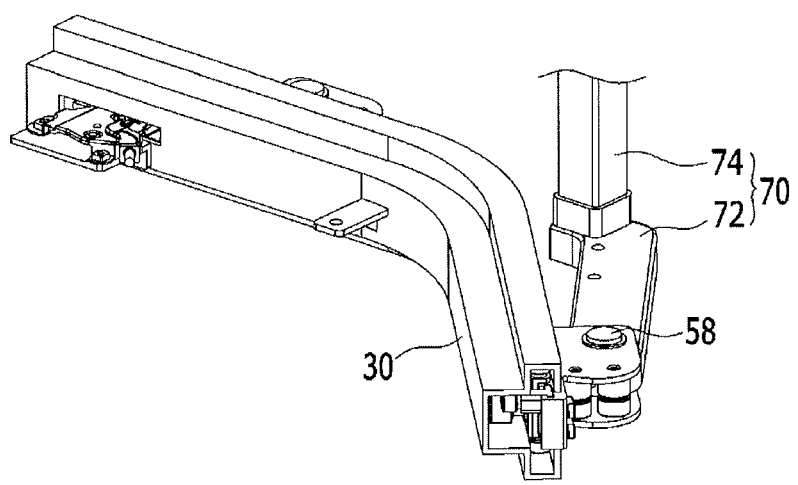
FIG. 12 illustrates a perspective view of a lower rail coupled to a connection structure in an exemplary rear door device in accordance with the present invention.
Figure 13:
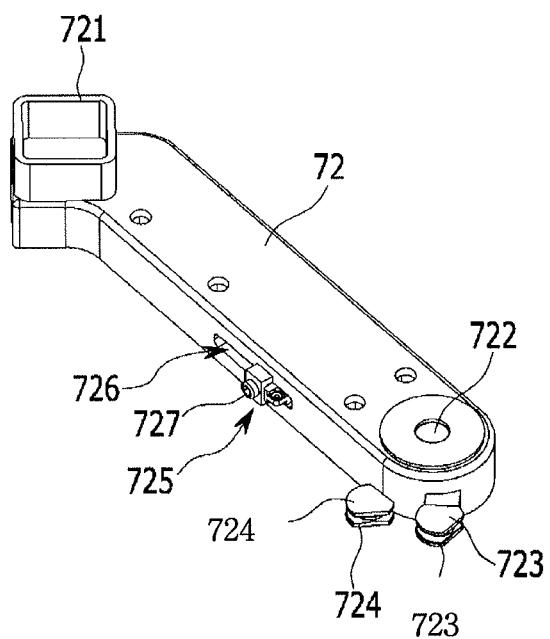
FIG. 13 illustrates a perspective view of a lower swing arm in an exemplary rear door device in accordance with the present invention.

Referring to FIGS. 12 and 13, the connection structure 70 may include a swing arm 72 having one end secured to the lower slider body 51 with the assembly pin 58, and a square support bar 76 having one end mounted to the other end of the swing arm 72 and the other end fixedly connected to the upper rail 20 as one unit.

The swing arm 72 may have one side fore end with a substantially square box shaped housing 721 formed as one unit therewith, and the housing 721 may have one end of the support bar 76 inserted therein fixedly mounted thereto.

The swing arm 72 may have the other side fore end with an assembly hole 722 formed therein for inserting the assembly pin 58 therethrough, and one side of the other side fore end with two pairs of first and second upper and lower wire guide flanges 723 and 724 fixedly secured thereto.

The first and second upper and lower wire guide flanges 723 and 724 are fixedly secured to the side of the swing arm 72 with a predetermined gap in a vertical direction, in which a roller may be mounted for guiding a wire to be described later inserted therein.

While the first upper and lower wire guide flanges 723 may be fixedly secured to a circumferential surface of the swing arm 72, the second upper and lower wire guide flanges 724 may be fixedly secured on a side of the swing arm 72 at a predetermined gap or distance from each other.

And, the swing arm 72 may have a first wire fixture 725 movably mounted to the side of the swing arm 72. That is, the swing arm 72 has a guide hole 726 formed in the side extended along the side, the first wire fixture 725 is movably mounted inserted in the guide hole 726 enabling to adjust a position thereof along the guide hole 726, and the first wire fixture 725 has a fastening bolt 727 provided thereto for securing the first wire fixture 725 to a predetermined position of the guide hole 726.

Figure 14:
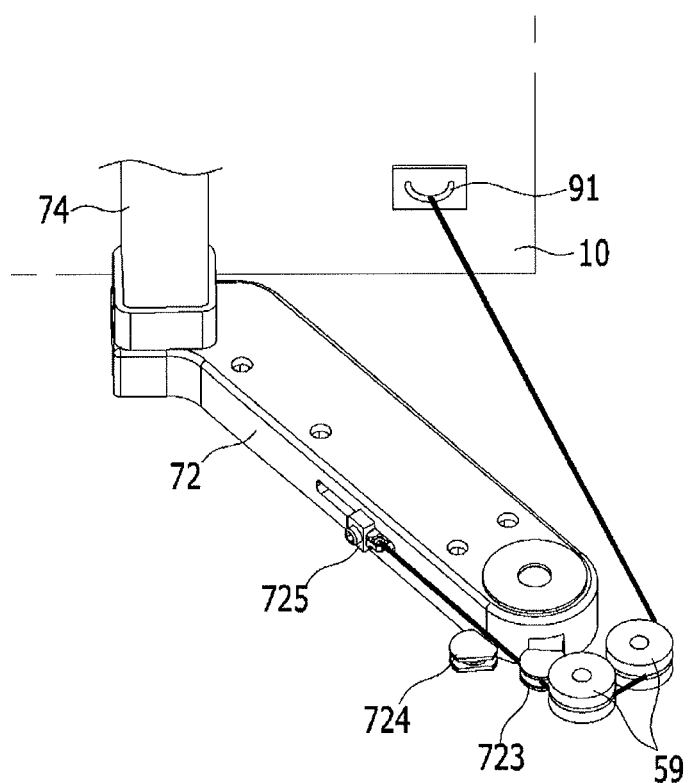
FIGS. 14 and 15 illustrate perspective views each for describing a winding structure of a rear door overhang preventive wire in an exemplary rear door device in accordance with the present invention.

Referring to FIG. 14, there is a second wire fixture 91 fixedly secured to a lower side of a right side of the rear door panel 10, to have one end of a wire 90 fixedly connected thereto, and the other end of the wire 90 is wound on the guide grooves 591 in the two guide rollers 59 and secured to the first wire fixture 725 of the swing arm 72 in a tightened state.

The wire 90 connects the lower side of the rear door panel 10 to the swing arm 72 through the lower slider 50 for securing the lower side of the rear door panel 10 to the vehicle body through the swing arm 72 via the lower rail 30. That is, the wire 90 serves as a securing point for securing the rear door panel 10 to the vehicle body. Consequently, overhang of the rear door or the rear door panel 10 in a process of opening/closing thereof can be prevented owing to the wire 90.

FIG. 14 illustrates a wire wound structure in a state the rear door is closed. The wire 90 is in a state in which the wire 90 is connected to the first wire fixture 725 from the second wire fixture 91 after passed through the first upper and lower guide flanges 723 through the two guide rollers 59 of the lower slider 50.

Figure 15:
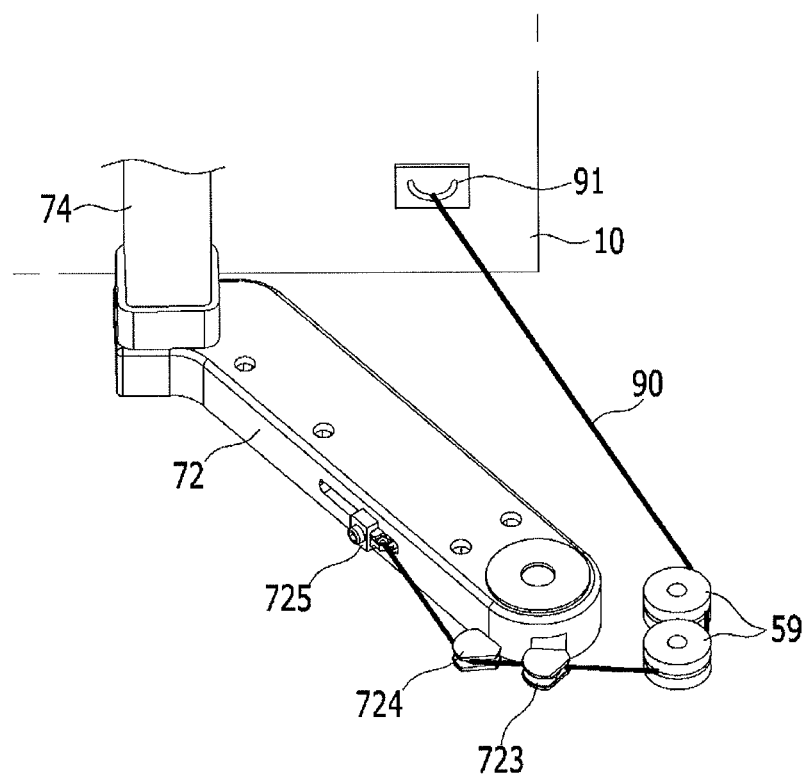

FIG. 15 illustrates a wire wound structure at the time the rear door is opened, fully. The wire 90 is in a state in which the wire 90 is connected to the first wire fixture 725 from the second wire fixture 91 after passed through the first upper and lower wire guide flanges 723 and the second upper and lower guide flanges 724 through the two guide rollers 59.

The wire 90 illustrated in FIGS. 14 and 15 serves as a securing point of the vehicle body as a winding structure thereof varies with the opening/closing of the rear door in a state a length of the wire 90 does not vary.

Figure 16A:
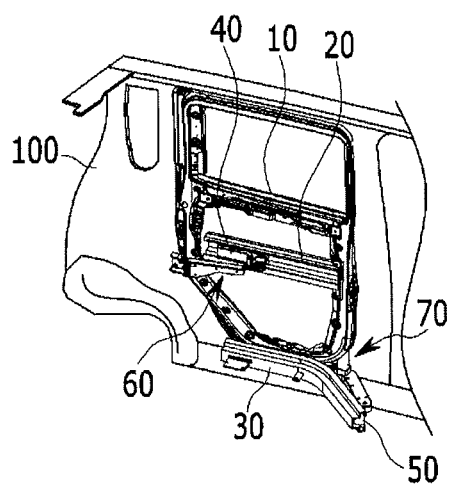
FIGS. 16(A) to (D) illustrate an exemplary rear door device in accordance with the present invention, describing operation thereof respectively.

Referring to FIG. 16A, the rear door or the rear door panel 10 closes the rear door opening in the vehicle body 100 to close the vehicle.

The mounting bracket 64 of the upper support structure 60 is mounted fixedly secured to a portion of the vehicle body 100 adjacent to the door opening formed in the vehicle body 100, the upper rail 20 is fixedly mounted to the rear door panel 10 in a width direction thereof, the upper slider 40 is inserted in the upper rail 20, and the upper slider 40 is secured to the swing arm 62 of the upper support structure 60.

And, the lower rail 30 is also fixedly secured to the vehicle body 100, the lower rail 30 has the lower slider 50 inserted therein, and the lower slider 50 is connected to the rear door panel 10 through the connection structure 70.

In a state the rear door panel 10 is closed, the relative movement between the upper slider 40 and the upper rail 20 is locked by the locking device 80.

Figure 16B:
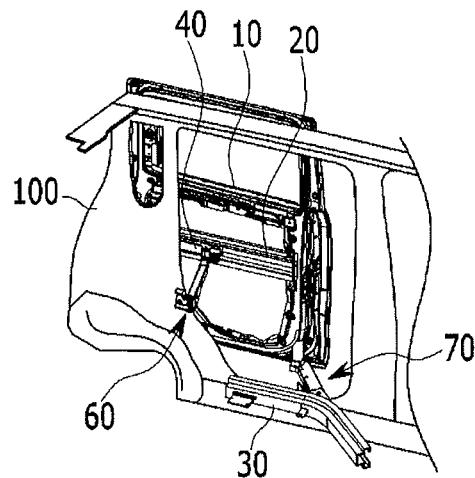

Referring to FIG. 16B, if the rear door panel 10 is opened in a state the rear door panel 10 is secured to the vehicle body 110, the rear door panel 10 swings outward in a width direction of the vehicle, rotating the swing arm 62 of the upper support structure 60 and the swing arm 72 of the lower connection structure 70 in a range of for example, up to about 80°, respectively.

At the time the swing of the rear door panel 10 is completed, the lower slider 50 is positioned at the curve portion 38 of the lower rail 30. Upon finishing the swing of the rear door panel 10, the striker 28 of the upper rail 20 is in a separably caught state at the second latch 84 of the upper slider 40.

Figure 16C:
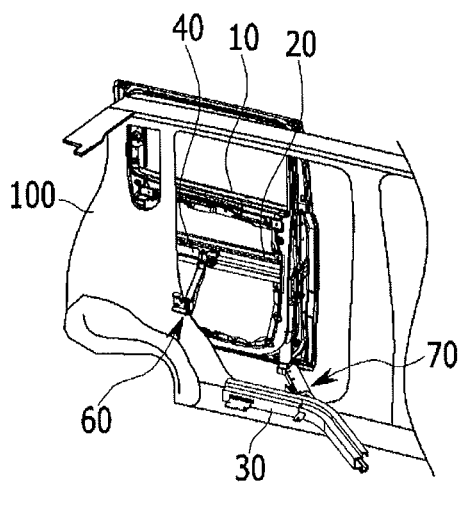

Under this state, if the rear door panel 10 is moved backward in the length direction of the vehicle, the rear door panel 10 slides along the lower rail 30 in a state an upper side of the rear door panel 10 is supported by the upper slider 40 and in a state the rear door panel 10 is supported on the lower rail 30 through the lower slider 50 by the connection structure 70, the upper slider 40 supports the upper rail 20 while rolling according to backward movement of the upper rail 20 in a state the upper slider 40 is inserted in the upper rail 20, and the lower slider 50 moves along a straight portion of the lower rail 30 as the lower slider 50 passes through the curved portion 38 of the lower rail 30 (See FIG. 16C).

Figure 16D:
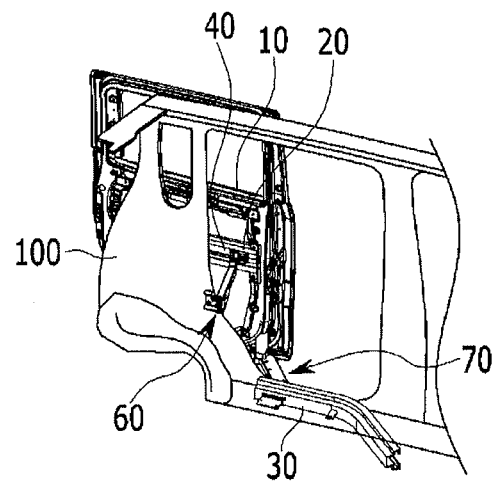

If the rear door 10 is opened fully as the rear door 10 slides backward in the length direction of the vehicle, the upper slider 40 is moved to an end portion of the upper rail 20 to be caught thereby, and the lower slider 50 moves along the lower rail 30 until the striker 55 of the lower slider 50 is caught at the hold open latch 35 mounted to the lower rail 30, to hold the opened state of the rear door 10 (See FIG. 16D).

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear door device in a vehicle comprising:
   a rear door;
   an upper rail mounted to the rear door in a width direction thereof;
   an upper slider inserted in the upper rail to support the upper rail;
   a lower rail mounted to a vehicle body and having a curved portion formed thereon;
   a lower slider inserted in the lower rail and movable along the lower rail;
   an upper support structure having a first end connected to the upper slider and a second end mounted to the vehicle body for supporting the upper slider; and
   a connection structure for pivotally connecting the lower slider to the upper rail,
   wherein the upper rail includes:
      a center rail positioned at a middle portion in a height direction of the vehicle;
      an upper side rail positioned over the center rail in the height direction; and
      a lower side rail positioned under the center rail in the height direction, and
      wherein the upper side rail and the lower side rail are positioned further at an inner side of the vehicle body in a width direction of the vehicle body than the center rail, and
   wherein the upper slider includes:
      an upper slider body of a substantially rectangular plate shape;
      two center rail rollers rotatably mounted to a front side of the upper slider body, arranged at a predetermined distance from each other in the width direction, to be inserted in the center rail of the upper rail for rolling as the upper rail moves;
      two upper side rail rollers rotatably mounted to the front side of the upper slider body, facing upward, arranged at a predetermined distance in the width direction for rolling according to movement of the upper rail;
      two lower side rail rollers rotatably mounted to the front side of the upper slider body, facing downward, arranged at a predetermined distance from each other in the width direction for rolling according to movement of the upper rail; and
      an upper flange and a lower flange projected from opposite edges of the upper slider body, each extended in a length direction substantially perpendicular to the respective edge, wherein the upper flange has a first assembly through-hole formed therein, and the lower flange has another first assembly through-hole, a second assembly through-hole, and a third assembly through-hole formed side by side.

2. The rear door device of claim 1, wherein:
   each of the center rail, the upper side rail and the lower side rail of the upper rail has a U shaped cross section continuous in a length direction thereof;
   openings of the upper side rail and the lower side rail of the upper rail are arranged substantially perpendicular to an opening of the center rail; and
   the openings of the upper side rail and the lower side rail of the upper rail are formed to face each other.

3. The rear door device of claim 2, further comprising a striker mounted to a lower side of a predetermined portion of the center rail of the upper rail in the length direction and projected upward in the height direction.

4. The rear door device of claim 1, wherein the upper support structure includes:

a swing arm having a first end rotatably and securedly inserted between the upper flange and the lower flange of the upper slider body; and a mounting bracket having a first end fastened to a second end of the swing arm, and a second end fixedly mounted to the vehicle body.

5. The rear door device of claim 4, wherein the swing arm includes:

a swing arm body;

a cylindrical first flange projected as one unit therewith from a first side fore end of the swing arm body; and two second flanges projected as one unit therewith from a second side fore end of the swing arm body in the width direction and arranged at a left side and a right side of the swing arm body, wherein the first flange has a cut-out portion such that one side edge of the cut-out portion forms a pressing edge, and a return spring is built-in or coupled with the cylindrical first flange.

6. The rear door device of claim 5, wherein the lower flange of the upper slider body has a rail locking device mounted thereto for selectively securing the upper rail to the upper slider.

7. The rear door device of claim 6, wherein the rail locking device includes:

a first latch and a second latch rotatably mounted in a second assembly through-hole and a third assembly through-hole in the lower flange of the upper slider body, respectively; and a pressing spring for applying a pressure to the first latch and the second latch in a clockwise direction, wherein the first latch includes a first hook at a first end thereof, and a pressing projection projected from an opposite side of the first hook so as to be pressed by the pressing edge, and the second latch includes a second hook for detachably hooking a striker, the second hook having an opened type hooking recess constructed of a first side and a second side which is substantially parallel to the first side and longer than the first side, and a latch projection for being detachably caught at the first hook of the first latch.

8. The rear door device of claim 1, wherein the lower rail includes:

a center rail positioned at a middle portion in a height direction of the lower rail;

an upper side rail positioned over the center rail; and a lower side rail positioned under the center rail.

9. The rear door device of claim 8, wherein each of the center rail, the upper side rail, and the lower side rail of the lower rail has a U-shaped cross section continuous in a length direction thereof, wherein the upper side rail, and the lower side rail of the lower rail have openings facing to each other and arranged substantially perpendicular to an opening of the center rail of the lower rail.

10. The rear door device of claim 9, wherein the center rail of the lower rail has a rear side fore end which faces a rear side of the vehicle when the center rail is mounted to the vehicle body, with a mounting hole formed therein, wherein a hold open latch is mounted to the mounting hole for coupling to the lower slider when the rear door is opened or fully opened.

11. The rear door device of claim 10, wherein the lower slider includes:

a lower slider body having a substantially rectangular plate shape;

two center rail rollers arranged at a predetermined distance from each other in a length direction thereof, rotatably mounted on a front side of the lower slider body, and inserted in the center rail of the lower rail for rolling;

two upper side rail rollers arranged at a predetermined distance from each other in the length direction rotatably mounted on the front side of the lower slider body adjacent to the two center rail rollers and inserted in the upper side rail of the lower rail for rolling; and two lower side rail rollers arranged at a predetermined distance from each other in the length direction adjacent to the two center rail rollers rotatably mounted on the front side of the lower slider body in a direction opposite to the two upper side rail rollers and inserted in the lower side rail of the lower rail for rolling, wherein the lower slider body has a striker mounted to a side fore end of the front side of the lower slider body in the length direction thereof for detachably coupling to the hold open latch to hold an opened state of the rear door.

12. The rear door device of claim 11, wherein the lower slider body has an adjuster hole formed in a second side fore end in the length direction thereof, with an adjuster block mounted thereto and adjustable in a vertical direction in a width direction of the lower slider body of the lower rail, and an adjuster roller rotatably mounted to the adjuster block.

13. The rear door device of claim 12, wherein:

the lower slider body of the lower rail has an upper flange and a lower flange formed as one unit therewith, the upper flange and the lower flange projected respectively from an upper edge and a lower edge extended in the length direction of the lower slider body of the lower rail and substantially perpendicular thereto; and a first end of the connection structure is rotatably and securedly inserted between the upper flange and the lower flange.

14. The rear door device of claim 13, wherein the connection structure includes:

a swing arm having a first end secured to the lower slider body of the lower rail; and a substantially square support bar mounted to a second end of the swing arm and fixedly connected to the upper rail as one unit therewith.

15. The rear door device of claim 14, wherein:

the swing arm has a first side fore end with a substantially square box shaped housing formed as one unit therewith, and the housing has a first end of the support bar inserted therein and fixedly mounted thereto;

the swing arm has one side at a second side fore end with two pairs of first and second upper and lower wire guide flanges fixedly secured thereto; and a roller is mounted to a gap between each of the first and second upper and lower wire guide flanges.

16. The rear door device of claim 15, wherein:

the swing arm has a guide hole formed in a side and extended along the side;

the first wire fixture is movably inserted in the guide hole and able to adjust a position thereof along the guide hole; and the first wire fixture has a fastening bolt provided thereto.

17. The rear door device of claim 16, wherein:

two guide rollers are rotatably inserted between the upper flange and the lower flange of the lower slider;

each of the two guide rollers has a guide groove formed in a predetermined portion in a length direction thereof and recessed in the respective guide roller continuously in a circumferential direction thereof;

a second wire fixture is fixedly secured to a lower side of a right side of the rear door panel;

a wire is wound or partially wound on the guide grooves of the two guide rollers in a tightened state, and has a first end fixedly connected to the second wire fixture and a second end secured to the first wire fixture of the swing arm.

18. The rear door device of claim 17, wherein the wire is selectively inserted between the second upper and lower wire guide flanges according to swing motion of the swing arm.

\* \* \* \* \*